Dec. 23, 1969    A. J. SARKA    3,485,146
CUTTING AND SCORING DIES

Filed Jan. 25, 1968    3 Sheets-Sheet 1

INVENTOR.
ALBERT J. SARKA
BY
Yount, Flynn & Tarolli
ATTORNEYS

Dec. 23, 1969          A. J. SARKA          3,485,146
                   CUTTING AND SCORING DIES
Filed Jan. 25, 1968                         3 Sheets-Sheet 2
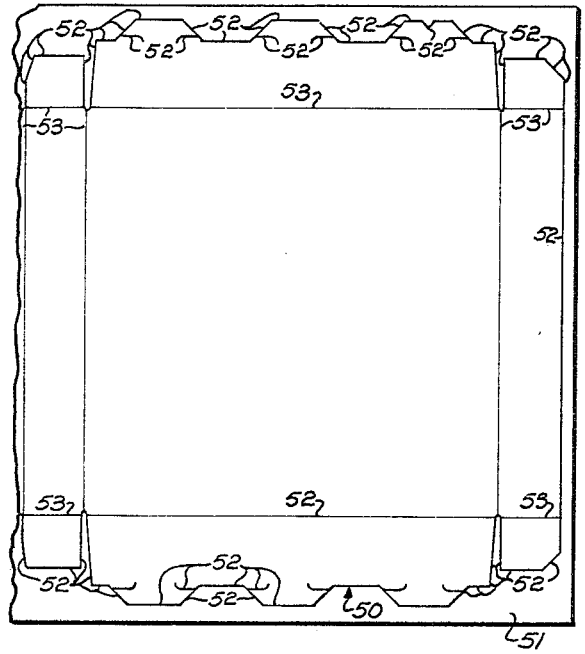
FIG. 5
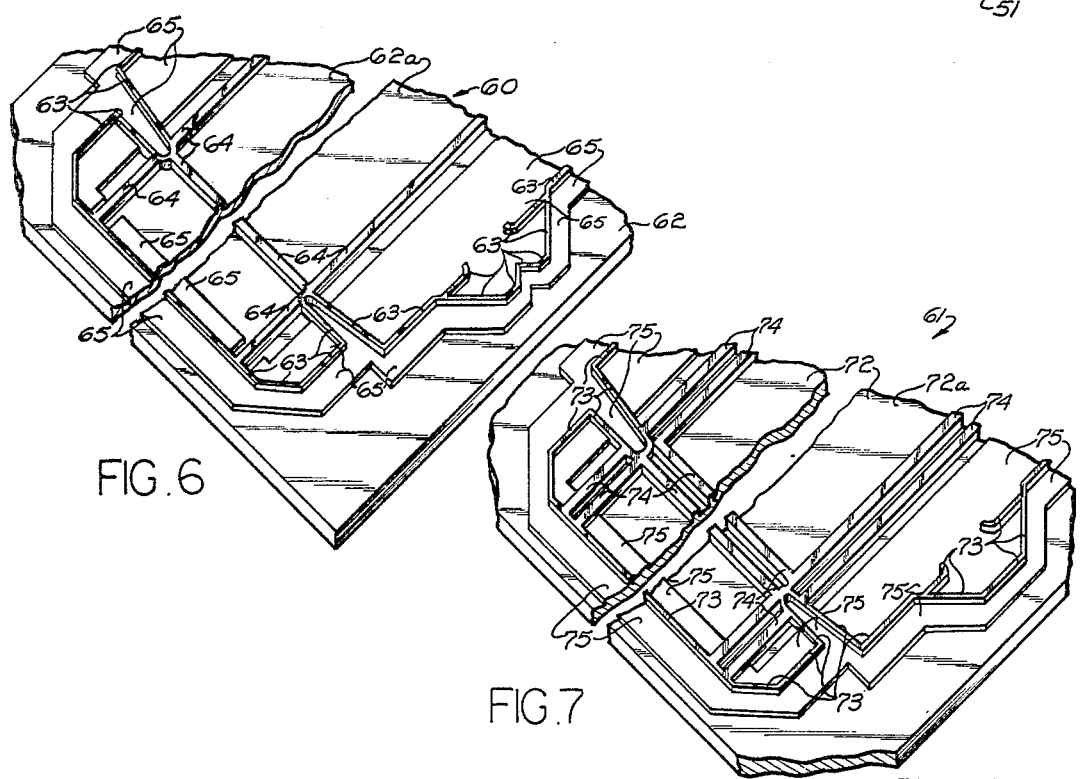
FIG. 6
FIG. 7
INVENTOR.
ALBERT J. SARKA
BY
Yount, Flynn & Jarolli
ATTORNEYS Dec. 23, 1969   A. J. SARKA   3,485,146
CUTTING AND SCORING DIES
Filed Jan. 25, 1968   3 Sheets-Sheet 3

INVENTOR.
ALBERT J. SARKA
BY
Yount, Flynn & Tarolli
ATTORNEYS

United States Patent Office 3,485,146
Patented Dec. 23, 1969

3,485,146
CUTTING AND SCORING DIES
Albert J. Sarka, Fairview Park, Ohio, assignor to Harris-Intertype Corporation, Cleveland, Ohio, a corporation of Delaware
Filed Jan. 25, 1968, Ser. No. 700,538
Int. Cl. B31b 1/14; B26d 1/00
U.S. Cl. 93—58                                                18 Claims

ABSTRACT OF THE DISCLOSURE

Apparatus for cutting and scoring sheet-like material comprises a pair of die plates. Each of the die plates includes at least one severing element. The severing elements on the die plates are cooperable to cut sheet-like material positioned therebetween. The severing elements on the die plates are mirror images of each other, and are in the form of narrow blades projecting above the main surface of the respective die plates. The blades have a substantially aligned relationship when operating to effect the severing of material positioned therebetween. The die plates may also have scoring elements thereon.

---

The present invention relates to apparatus for cutting sheet-like material, and particularly relates to apparatus for cutting and scoring sheet-like material which comprises a pair of die plates which have severing and scoring elements thereon to effect the severing and scoring of sheet material positioned therebetween.

Recently a substantial break-through was accomplished in the cutting and scoring field. (See modern Packaging Magazine December 1966, "New Way to Cut and Crease Cartons.") In particular, new and improved cutting and scoring dies were developed for use in forming carton blanks, and the like, from sheet-like material, either in web or sheet form. The improved dies are disclosed in United States Patent No. 3,142,233 to Downie, issued July 28, 1964. In the Downie patent, the cutting and creasing of the sheet material is effected by a pair of die plates, each of which include at least one severing land cooperable with a severing land of the other die plate to cut sheet-like material positioned therebetween. The die plates also include scoring lands in order to provide score lines on the sheet-like material. While the die plates disclosed in the Downie patent have numerous advantages over the art prior to that time, in actual practice and application of these die plates to production jobs, many problems have been uncovered.

The cutting is effected as disclosed in the Downie patent by the lands formed on the die plates and which normally overlap to a minor degree, that is, a minor portion of a sheet-severing land on one of the die plates overlies a minor portion of a cooperating sheet-severing land on the other die plate to effect the severing of the material. This requirement of a minor portion of the sheet-severing lands overlapping each other has created substantial problems in effecting registry of the die plates in the machinery in which the die plates are utilized and, additionally, has created substantial problems in the accurate manufacture of the die plates requiring each die plate to be different from the other, insofar as the severing lands are concerned. As a result, complicated techniques have been developed in order to effect the manufacture of the die plates with great accuracy. United States Patent No. 3,341,329 directed to "Photomechanical Method for Producing Cutting Dies" issued Sept. 12, 1967, to Blake is the technique which is in use for manufacturing the die plates disclosed in the afore-mentioned Downie patent.

Not only have the die plates described in the Downie patent created problems from the standpoint of registry and manufacture of the die plates, but in use the die plates have also encountered problems. A substantial problem in the use of the Downie die plates has been created by the fact that "broke," i.e., small pieces of waste material between adjacent carton layouts, tends to stick between the cutting lands formed in the dies. This broke, when so lodged between cutting lands, creates a substantial problem for the dies and results in damage to the dies when the dies are used with the broke lodged therein. Moreover, the dies are not effective to properly sever material if broke is lodged therein. In view of the tendency of the dies of the Downie patent to retain material therein, the apparatus which is utilized incorporating the dies has been designed with broke detectors and the like for sensing material lodged in the dies, but such detectors have not been entirely satisfactory. Failure to detect sticking broke results in die damage, often requiring die replacement, or shortening die life. This results also machine stoppage during die replacement.

In addition to the problems outlined above, the dies discolsed in the Downie Patent No. 3,142,233 are subject to a still further problem in that the scoring lands which are utilized cannot contact and extend from a severing land. Therefore, the score lines formed on the material do not extend to the edges of the carton blank and, as a result, this can affect the folding of the carton, particularly by automatic machinery.

In summary, therefore, while the dies disclosed in the afore-mentioned Downie patent consisted of a substantial break-through in the cutting and scoring art, the manufacture and use of such dies is not free of practical problems. Many of the above-mentioned problems add to the cost of the dies disclosed in the Downie patent, making them relatively expensive, as well as adding to the cost and complexity of the machinery in which the dies are used.

Accordingly, the principal object of the present invention is the provision of new and improved cutting dies which are free of the above-noted problems and, therefore, are relatively low in cost, can be easily made accurately, are easy to register in the cutting apparatus in which they are used, and which operate with a minimum of material becoming lodged in the dies.

A still further object of the present invention is the provision of a new improved apparatus for cutting sheet-like material and which comprises a pair of die plates having severing elements which are cooperable to cut sheet-like material positioned therebetween, the severing elements on the die plates being in the form of blades projecting above the main surface of the die plates, and wherein the die plates can be manufactured accurately in a simple and reliable manner and can be mounted in a cutting apparatus with minimum problems of registry.

A further object of the present invention is the provision of a new and improved apparatus for cutting sheet-like material which comprises a pair of die plates having severing elements which are cooperable to cut sheet-like material positioned therebetween, and wherein the severing elements on the die plates are in the form of blades projecting above the main surface of the die plates, with the blades on the die plates being mirror images of each other and having a substantially aligned relationship with each other when operating to effect the severing of material positioned therebetween.

A still further object of the present invention is the provision of a new and improved apparatus for cutting sheet-like material which includes a pair of die plates which have blades thereon projecting above the main surface of the die plates and wherein the blades recesses therein and the die plates include means engaging the opposite sides of the material while the lands are effecting a severing of the material and which blocks movement of the material into the recesses on either of the die plates.

Another object of the present invention is the provision of a new and improved apparatus for cutting sheet-like material, as noted in the next preceding paragraph, wherein the means on the die plates for engaging the opposite sides of the material comprises lands standing above the main surface of the die plate and extending on opposite sides of the severing blades, and which lands block movement of the material into the recesses.

Still another object of the present invention is the provision of a new and improved apparatus for cutting and creasing sheet-like material which comprises a pair of die plates, with the die plates including severing elements and scoring rules or elements, and wherein the scoring elements contact the severing elements and extend therefrom in the plane of the die plates, thus providing a score line on the material which extends to the line of severance on the material.

The afore-mentioned problems presented by the dies of the Downie patent and the above objects are solved in large measure by the present invention. The present invention, in essence, comprises a pair of die plates which includes severing elements thereon in the form of blades which are substantially aligned with each other when operating to cut sheet material positioned therebetween. These blades are mirror images of each other, and, therefore, the construction of the die plates is relatively simple. Moreover, the scoring elements which may be formed on the die plates extend from the blades. Furthermore, the die plates include means for blocking the material from lodging in any recesses defined in the die plates by the severing elements.

Further objects and advantages and structural features of the present invention will be apparent to those skilled in the art to which it relates from the following detailed description of the present invention made with reference to the accompanying drawings forming a part of this specification and in which:

FIG. 5 is a fragmentary view of a portion of a carton blank similar to that of FIG. 1 and to be formed by the dies of the present invention;

FIGS. 6 and 7 are perspective views of the cooperating dies embodying the present invention and which operate to form the carton blank of FIG. 5;

The present invention provides an improved cutting and creasing apparatus of the type which utilizes a pair of cooperating die plates to effect the cutting and creasing of sheet-like material. Each of the die plates includes at least one severing element, with the severing element on one die plate being cooperable with the severing element on the other die plate to cut sheet-like material positioned therebetween. The severing elements on the die plates are in the form of blades which project above the main surface of the respective die plates. Scoring elements may be provided on the die plates in order to effect the scoring of the sheet material at desired locations. The present invention provides die plates of a construction so that they effectively operate to sever the sheet-like material, and yet which eliminate many of the problems of the prior art in the areas of manufacture of the die plates, registry of the die plates, and sticking of cut material in the die plates.

Figure 2:
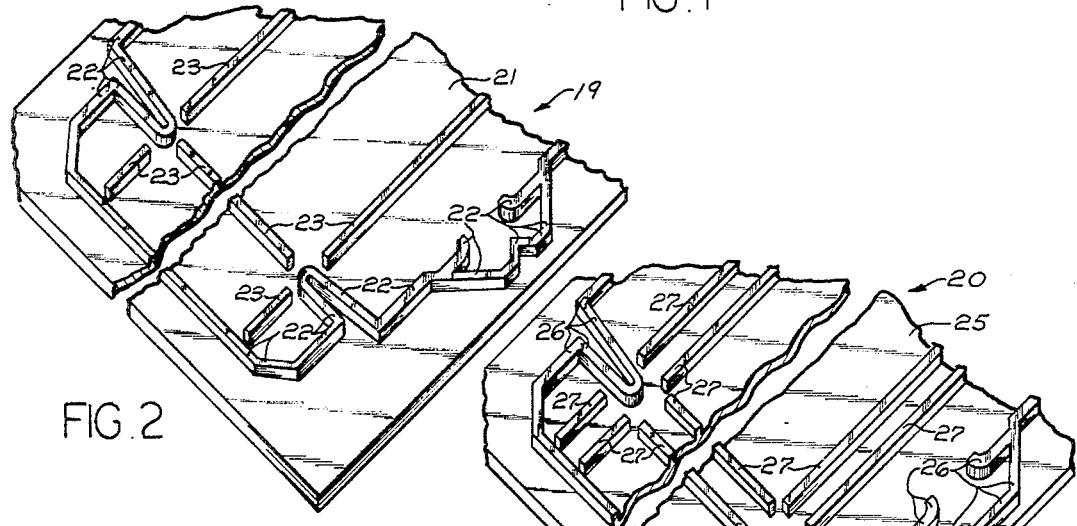
FIGS. 2 and 3 are perspective views of prior art Downie die plates for forming the carton blank shown in FIG. 1.
Figure 3:
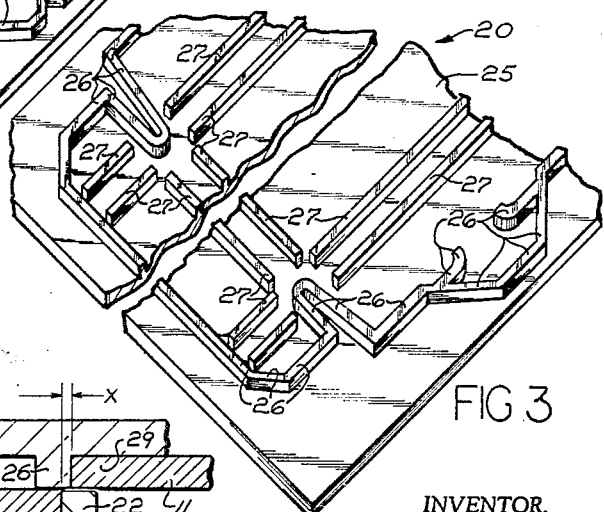
Figure 4:
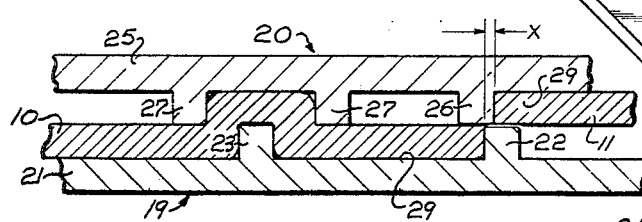
FIG. 4 is a cross-sectional view of the prior art dies of FIGS. 2 and 3 in operative position.
Figure 8:
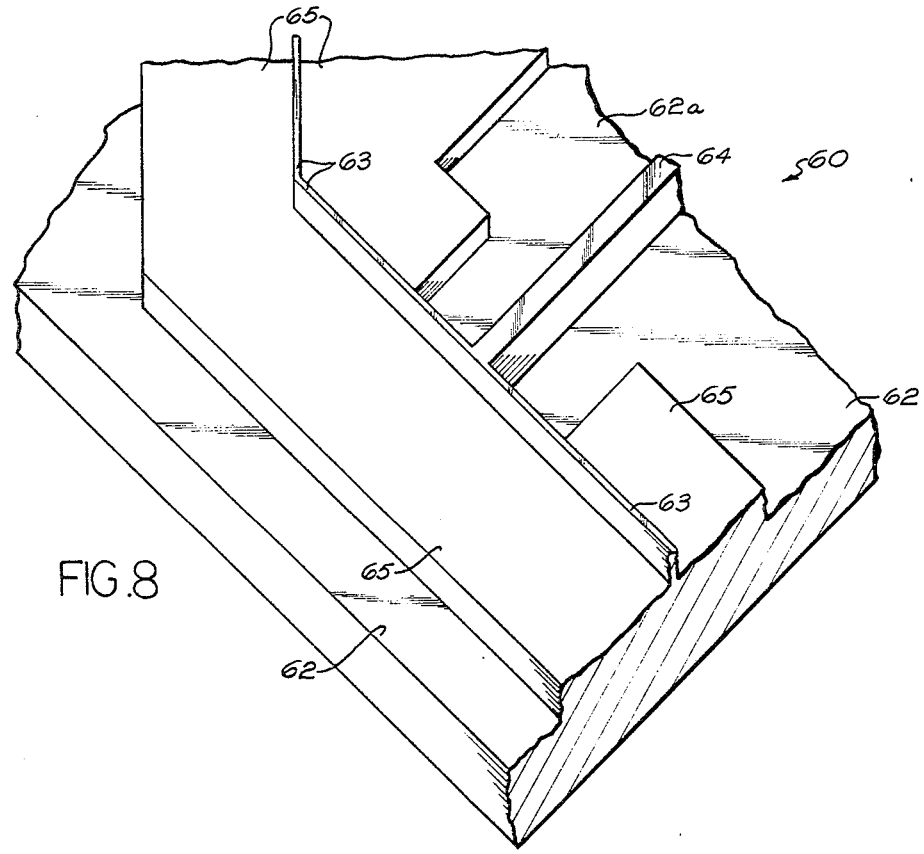
FIG. 8 is an enlarged fragmentary view of a portion of the die plate shown in FIG. 6.

In order to fully appreciate the contribution of the present invention to the state of the art, it is believed necessary to understand the state of the art. The afore-mentioned Downie United States Patent No. 3,142,233 discloses dies for cutting and scoring sheet-like material. FIGS. 2, 3 and 4 of the present application illustrate dies of the type disclosed in the Downie patent for forming a carton blank 10 from sheet material 11, such as cardboard or the like. Moreover, it is well known to cut material with a cutting element acting against a planar surface, and as well to "cut score" material by cutting partly through the material in this manner.

Figure 1:
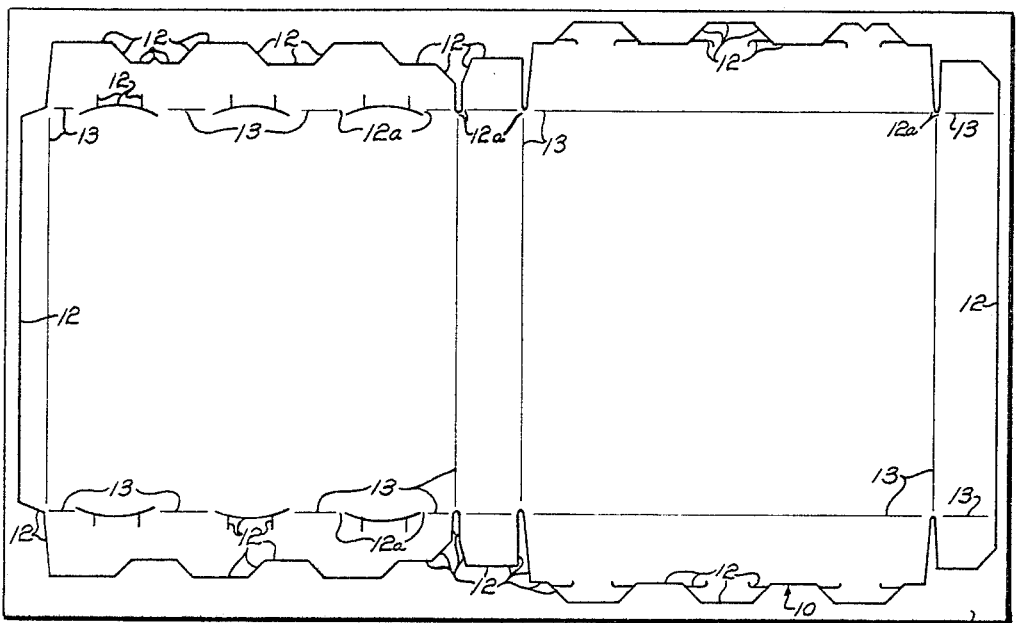
FIG. 1 is a plan view of a carton blank to be cut from sheet material by the die plates of the afore-mentioned Downie patent.

While only a single carton blank 10 is shown as being formed from the material 11, it should be apparent that a series of carton blanks ar normally formed from a single sheet of material by a single pair of dies. Alternatively, rather than sheet material, as illustrated in FIG. 1, the material from which the carton blanks are cut could be web material. These facts are true of the improved dies of the present invention, as well.

The carton blank 10 will not be described in detail, since the specific details of the carton blank are not important to the present invention and any design of carton blank could be cut by the dies of the Downie patent, as well as the dies of the present invention to be described hereinbelow. It should suffice to state that the carton blank, as is readily apparent in FIG. 1, includes a plurality of panels which comprise bottom, top and side panels of the carton to be formed from the blank. In addition, flaps and tabs may be provided on the carton blank for purposes of securing the various panels in position. The tabs cooperate with slits in certain portions of the carton blank in order to hold the carton in a folded condition.

In order to form the blank 10, the material 11 is cut along the solid lines of severance, designated 12. The carton blank 10 also has a plurality of score lines 13 which are preferably formed in the carton blank 10 by the same dies which effect severing thereof. Once the carton blank is formed from the sheet material 11, it may be folded along the score lines 13 to form the carton for purposes of use. The carton blank is generally utilized in automatic folding equipment which shapes the carton from the blank. It should be noted that the score lines 13 shown in FIG. 1 do not extend from the cut lines 12, but rather stop short of the cut lines 12, as indicated at 12a. The reason for stopping the score lines short is due to the construction of the prior art dies which are to be described hereinbelow.

FIGS. 2 and 3 illustrate fragmentary portions of male and female dies 19, 20, respectively, of the type disclosed in the Downie Patent No. 3,142,233 for cutting and scoring the carton blank shown in FIG. 1. The portion of the dies illustrated forms the right end portion of the carton blank 10, as viewed in FIG. 1. The die 19 includes a main body or die plate portion 21. A series of severing lands 22 extend outwardly from the body 21. The die 19 also includes male scoring lands 23. The die 20 also has a main body portion 25, and includes severing lands 26 project outwardly from the main body portion 25. Female scoring elements in the form of a pair of spaced lands 27 also project outwardly from the main body 25 of the die 20. The severing lands 22, 26, on the die plates 19, 20, respectively, cooperate to effect a severing of material therebetween, and the male scoring lands 23 and the female scoring lands 27 cooperate to effect scoring of the material positioned therebetween.

The severing lands 22, 26 are positioned on the die plates 19, 20, respectively, in order to cut the material 11 at the desired location in order to form the lines of severance 12 in the material 11. The scoring lands 23, 27 are located on the dies 19, 20, respectively, in order to score the material at the desired location to form the score lines 13. As illustrated in FIG. 4, the scoring elements are constructed so that the lands or male scoring elements 23 are located on die 19 so as to force material into the space between the female scoring lands 27 on the die 20. In this manner, the scoring elements crimp the material and provide the score lines 13 therein. Also as shown in FIG. 4, the severing lands 22, 26 cooperate to sever material therebetween. These severing lands normally require a predetermined slight overlapping relationship in the plane of the sheet material in order to effect the severing of the sheet material positioned therebetween. This overlapping relationship is indicated by the dimension X in FIG. 4.

As discussed in detail hereinabove, the problems of providing the proper overlapping relationship for the severing lands 22, 26 are substantial and provide a substantial cost factor in the manufacture of the dies 19, 20. The problems are in the area of providing the accurate positioning of the lands 22, 26 on the die plates 19, 20, respectively, so as to provide the proper overlap when the die plates 19, 20 are mounted in the apparatus in which they are used. This problem is magnified when the plates are used to form numerous carton blanks. In such a case, it is necessary to maintain a proper relationship between the severing and scoring lands for one carton and the corresponding lands for all other cartons. Moreover, the material which is cut by the die plates is forced into the recesses, such as 29, formed between the severing lands on the respective die plates. This is particularly a problem when a small waste piece, commonly termed "broke," is entirely severed from the material 11, such as when a window, or the like, is cut in a carton blank, or a broke piece is located between two cartons cut from the material.

Moreover, the severing lands 22, 26, themselves, cooperate to sever the material along a generally slanted line, as is known. As a result, material tends to stick in the recesses 29 in the die plates, creating the above-noted problems. Furthermore, as should be clearly apparent from FIGS. 2 and 3, the scoring lands 23, 27 cannot extend up to and contact the severing lands 22, 26, respectively, and, therefore, the score lines 13 on the carton blank 10 are shorter than what is desired for proper subsequent shaping of the carton. All of these problems which have been discussed above are practical problems involved in the use of the dies disclosed in the afore-mentioned Downie patent.

These above-noted problems are solved by the use of die plates constructed in accordance with the present invention. The die plates of the present invention will be described and illustrated as constructed for forming a carton blank 50 from sheet mateiral 51, see FIG. 5. The carton blank 50 is similar to the carton blank 10 discussed above. The entire carton blank 50 is not illustrated, since it would be merely substantially repetitive of the carton blank 10 shown in FIG. 1. The carton blank is formed by cutting of the material 51 along cut lines 52 and by scoring along score lines 53, so that certain panels and flaps of the carton blank may be folded in order to form the final carton from the blank. The score lines 53, as should be apparent from FIG. 5, are capable of now extending completely between the lines of severance 52 and intersect completely between the lines of severance 52 and intersect those lines of severance. This is a result of the particular construction of the cutting elements on the improved dies to be described below.

The carton blank 50 is formed from the material 51 by a pair of male and female die plates 60, 61, respectively, illustrated in FIGS. 6 and 7. The die plate 60 comprises a main or base portion 62. The main portion 62 of the die plate 60 has a plurality of severing blades 63 extending outwardly therefrom. The die 60 also has a plurality of male scoring rules 64 extending outwardly therefrom. In addition, the die plate 60 includes lands 65 which extend outwardly from the base portion 62 of the die 60 to a height below the height of the severing blades 63, and which is approximately one-half of the thickness of the carton material 51 being cut. The lands 65 extend along the length of the severing blades 63 and are preferably integral therewith.

The female die 61, illustrated in FIG. 7, includes a main base portion 72. The main base portion 72 of the die 61 has severing blades 73 extending therefrom and which cooperate with the severing blades 63 on the die 60 to form the lines of severance 52 in the material 51. The die 61 also includes pairs of scoring elements which are designated 74, and which comprise female scoring rules which cooperate with the male scoring rules 64 on the die 60 to form the score lines 53. The die 61 also includes lands 75, similar to the lands 65 on the die 60. The lands 75 extend along the severing blades 73 and lie on opposite sides thereof in a manner similar to the lands 65 on the die 60. The function of the lands 65, 75 will be described hereinbelow.

Insofar as the male scoring rules 64 and the female scoring rules 74 are concerned, these may take many different forms. For purposes of the present application, these scoring rules may be similar in function to the scoring lands shown in the afore-mentioned Downie patent, with the exception that these scoring rules are capable of and do contact and extend from the severing blades on the respective dies, as clearly illustrated in FIGS. 6 and 7.

Figure 9:
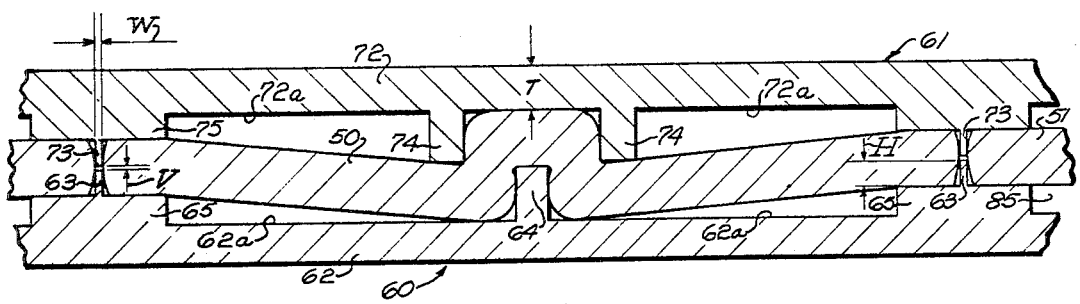
FIG. 9 is a sectional view illustrating the die plates of FIGS. 6 and 7 in operative position.

The severing blades 63, 73 formed in the dies 60, 61, respectively, are mirror images of each other, rather than offset as in the afore-mentioned Downie patent. In view of the fact that the severing blades 63, 73 are mirror images of each other, and are, therefore, of identical size and relative location on the die plates, the severing blades 63, 73 are aligned with each other during the cutting of the material 51. It has been found that the blades 63, 73 press on the material positioned therebetween and effectively sever the material even though the blades 63, 73 do not contact each other during the severing operation, as illustrated in FIG. 9. The blades 63, 73 are of a width, designated by the dimension W in FIG. 9, of preferably .003 to .010 inch. The gap between the blades 63, 73 when in operating position, designated V in FIG. 9, is approximately .002 inch. The height of the blades 63, 73 from the main surfaces 62a, 72a of the die plates 60, 61, respectively, designated H in FIG. 9, is preferably one-half the thickness of the stock, for example, is .010 inch, for a stock thickness of .020 inch. The thickness of the main body portions 62, 72 of the die plates 60, 61, as designated T in FIG. 9, may vary, but preferably is approximately .015 inch.

The die plates 60, 61 when operating, as shown in FIG. 9, effect a severing of the sheet material positioned between the blades 63, 73. The severing occurs substantially centrally of the blades 63, 73. The cutting of the material by the blades 63, 73 is effected by pressing them on the opposite sides of the material 51, and a projection of the blades into the thickness of the material 51 from each side thereof. However, as noted hereinabove, the blades 63, 73 do not contact each other during the severing operation. During the severing operation, the lands 65, 75 support the opposite sides of the material 51 which is positioned between the dies 60, 61. The lands 65, 75 block movement of cut material into recesses, such as recess 85, defined by the severing elements on the die plates 60, 61. In this manner, the lands 65, 75 hold the material substantially centrally located between the die plates 60, 61 and prevent the cut material from becoming lodged in the die plates 60, 61. As a result, the die plates 60, 61 are for this reason alone a substantial improvement over the prior art. Instead of completely displacing the material cut into two planes, as with the Downie dies. The dies of the present invention by pinching the material between two blades keep it in the same plane at all times. This also prevents what is termed "interlocking," which results from the edges at the cut line of the material cut by the Downie dies actually catching and holding the carton sections in their offset planes, as shown in dotted lines in FIG. 4. This causes serious carton feeding problems on subsequent carton-handling machinery.

Moreover, since the blades 63, 73 on the die plates 60, 61, respectively, are mirror images of each other, the blades may be formed in a simple manner through the use of a single negative rather than by the complicated technique disclosed in the afore-mentioned Blake patent. The die plates 60, 61 are made preferably by a chemical etching process which involves photographic techniques. This is described in the afore-mentioned Downie patent. Since the blades 63, 73 are mirror images of each other, only a single negative is required for forming the blades on the die plates 60, 61. This is true, even though the carton layout on a die usually includes several side-by-side cartons. The process involves the photographic forming of a resist on the areas of the die plates which are to become the blades for cutting and the rules for scoring, so that those areas will not be etched. Then an etchant is applied to the die plates 60, 61 to etch away the areas of the die plates without the resist. The lands 65, 75 may be formed by partially etching away those areas which are to become the lands and then forming a protective covering on those areas after a certain amount of etching has been effected, so that those areas would be no longer etched, and only the remaining areas of the die plates would continue to be etched. Etching is necessary to the depth of 62a, 72a for the form of dies which use the scoring rules, as illustrated. The scoring lands 64, 74 compress the stock as shown, but require the distance from the top of the land to the opposite die to be approximately stock thickness. Thus, the illustrated dies have three effective levels. If scoring is not required on a particular job, the entire dies need be etched only to the first level, i.e., that of the lands 65, 75, and the dies may be substantially thinner if desired.

In addition to the various advantages, which have been discussed hereinabove, from the construction of the mirror image blades, the die plates 60, 61 of the present invention can be readily used in either rotary, platen, or flat-bed machinery. If used in a rotary machine, the die plates are made from a suitable alloy steel and in view of the thin construction of the die plates, are substantially flexible and may be bent in order to be mounted on a cylinder for effecting cutting and creasing of sheet material which is advanced between the nip of the cylinders, as shown in Sarka United States Patent No. 3,238,853.

The die plates of the present invention may also be equally used in flat-bed or platen-type cutting apparatus where reciprocating motion of at least one of the die plates is effected by the apparatus. The die plates 60, 61 of the present invention are, it is believed, particularly adapted to such use, as opposed to the pie plates disclosed in the afore-mentioned Downie patent. In view of the fact that the die plates of the present invention minimize the sticking of material in the die plates, the feeding of the material over the die plates can be readily accomplished as is required in a flat-bed or platen-type apparatus. When used in such machines, the dies may be made in the form of thick plates. These plates may be one piece, as is used on rotary machines, or may be made of a plurality of individual sections, which are separately mounted on their respective machine parts.

Since the die plates 60, 61 have their blades 63, 73 of a mirror image cnostruction, the machines in which the dies are to be mounted are more easily adjusted for purposes of cutting and creasing as opposed to machines which utilize the Downie-type dies normally requiring the precise minor overlap of the severing lands for purposes of cutting, as described hereinabove. It is a simple matter to run a transparent sheet between the dies 60, 61 while the blades have a marking material on their surfaces. With cutting pressure removed, the blades 63, 73 mark the transparent material and provide a visual indication of any die misalignment. The cylinders may then be moved according to the afore-mentioned Sarka patent to correct the misalignment.

Furthermore, it has been found that the dies of the present invention are capable of cutting a wide range of stock thicknesses with the same vertical gap V setting. As a result, the problems of varying this vertical gap are minimized, as opposed to the teaching of the Downie construction where the vertical gap between the die plates varies substantially for different stock thicknesses. As a result, for rotary cutting applications, solid rolling contact cylinder bearers may be utilized, such as are utilized in rotary machinery, such as printing presses.

In addition, the fact that the severing blades 63, 73 contact the scoring elements 64, 74, there are no spaces between the severing elements and the creasing elements which would provide areas where flexing of the dies may be concentrated, and may occur as in the case with respect to the dies disclosed in the Downie patent. In fact, such spaces in the Downie dies are subject to die cracking, and thus the dies of the present invention are believed to have a substantially longer life.

Furthermore, the fact that the dies disclosed in the Downie patent effect an angle cut on the material, as indicated at 30 in FIG. 4, has created problems in handling of the cut carton blanks. Due to the offsetting of the cartons in parallel planes during cutting, one cut edge of a carton blank will be displaced outwardly of the plane of the material and due to the angle cut, cannot move back into the plane of the carton blank. As a result, the feeding of additional blanks onto that particular blank is interfered with by the projecting edge.

While the blades 63, 73 are shown in the drawings as having flat ends, the blades 63, 73 could have rounded ends as well, and in actual practice, the ends of the blades 63, 73 shown, could wear to a rounded shape.

It is believed clear from the above description that applicant has provided a substantial improvement in the cutting and scoring art and that the dies described hereinabove have substantial advantages over the prior art. In summary, these advantages involve the substantial lessening of the problems of manufacture of the dies and mounting of the dies accurately in suitable apparatus for effecting the cutting and creasing of the material. Thus, as a result, the dies are substantially lower in cost. In addition, the dies are constructed in a manner such that they do have a minimum possibility of material sticking in the dies and, thus, have less tendency to create problems as a result thereof. Moreover, the dies are of a generally stronger construction and, therefore, have a substantially longer life and are less likely to become damaged.

It should be apparent from the description hereinabove that certain modifications, constructions, and adaptations may be made in the present invention, and it is intended to cover all such constructions, modifications, and adaptations which come within the scope of the appended claims.

Having described my invention, I claim:

1. Apparatus for cutting sheet-like material comprising a pair of die plates, each of said die plates including at least one severing element, a severing element on one die plate being cooperable with a severing element on the other die plate to cut sheet-like material positioned therebetween, said severing elements on said die plates being in the form of thin blades standing above the main surface of the respective die plates, said blades being the mirror image of each other and being in substantial alignment with each other when operating to effect the severing of the material positioned therebetween.

2. Apparatus as defined in claim 1 wherein said die plates include scoring elements thereon which effect scoring of the sheet material, and wherein the scoring and severing elements and the die plates are all of one homogeneous piece.

3. Apparatus as defined in claim 1 wherein said die plates further include means adjacent opposite sides of each of said blades and for engaging the opposite sides of the material while the blades are pressing thereon.

4. Apparatus, as defined in claim 1 wherein said co-operating blades on the die plates when operating to sever material are spaced from each other.

5. Apparatus as defined in claim 1 wherein blades on each die plate define a recess therebetween, and further including means on each of said die plates for engaging the opposite sides of the material while said blades are pressing thereon for blocking movement of the material into said recesses on either of said die plates.

6. Apparatus as defined in claim 5 wherein said means comprises lands of a height less than the height of said severing lands and extending in contact therewith on the opposite sides thereof.

7. Apparatus as defined in claim 2 wherein said scoring elements extend above the main surface of the die plates and extend in the plane of the respective die plates from a blade thereon.

8. A die for forming a pattern of lines of severance in sheet material, said die being adapted for mounting in a cutting apparatus and comprising a pair of co-acting die plates, each of said die plates being all of one homogeneous piece and including sheet severing elements in the form of blades projecting from the surface of the main body of the plate, said sheet-severing elements being disposed along the lines where the sheet material is to be severed and so positioned on the respective die plates that when the die plates are in operating position a sheet-severing element on one of said die plates is substantially aligned with a co-acting sheet-severing element on the other of said die plates.

9. A die for forming a pattern of lines of severance as defined in claim 8, wherein said die plates include lands of a height less than the height of said blades and which extend in contact with said blades substantially along the length of said blades on opposite sides thereof.

10. Apparatus as defined in claim 9 wherein said lands have approximately one-half the height of said severing elements.

11. Apparatus as defined in claim 9 wherein said blades define a recess therebetween and said lands block movement of material into said recess.

12. Apparatus as defined in claim 8 wherein said blades when operating to sever the material extend into said material but do not contact each other.

13. Apparatus for cutting sheet-like material comprising a pair of die plates, each of said die plates including plural severing elements, the severing elements on one die plate being cooperable with the severing elements on the other die plate to cut sheet-like material positioned therebetween, said severing elements on said die plates being in the form of blades standing above the main surface of the respective die plates, said blades pressing on the opposite sides of the material and thereby effecting severing of the material positioned therebetween, said blades on each die plate defining a recess therebetween, and means on said die plates for engaging the opposite sides of said material and blocking movement of said material into said recesses on either of said die plates.

14. Apparatus as defined in claim 13 wherein said means comprises lands formed in said die plates and which extend along the opposite sides of blades and which are of a height less than the height of said blades.

15. Apparatus as defined in claim 13 wherein said blades are the mirror image of each other and are substantially aligned with each other when operating to effect the severing of the material positioned therebetween.

16. Apparatus for cutting and scoring sheet-like material comprising a pair of die plates, each of said die plates including at least one severing element, the severing element on one die plate being cooperable with the severing element on the other die plate to cut sheet-like material positioned therebetween, said severing elements on said die plates being in the form of blades standing above the main surface of the respective die plates, one of said die plates including at least one scoring element comprising a male scoring rule and the other of said die plates including a pair of spaced scoring elements comprising female scoring rules, said one scoring element being located to force material into the space between said pair of scoring elements to provide a score line on said material, and said scoring elements on said die plates comprising narrow projections extending above the main surface of the respective die plates and in contact with the blade on the respective die plate and extending in the plane of the respective die plate from the blade thereon.

17. Apparatus as defined in claim 16 wherein said blades are the mirror image of each other and are substantially aligned with each other when operating to effect the severing of the material positioned therebetween.

18. Apparatus as defined in claim 17 and wherein said die plates include lands of a height less than the height of said blades and which extend in contact with said blades substantially along the length of said blades on opposite sides thereof.

References Cited

UNITED STATES PATENTS 3,170,342  2/1965  Downie _____ 76—107
3,182,530  5/1965  Scott et al.

BERNARD STICKNEY, Primary Examiner

U.S. Cl. X.R.

83—343, 679; 93—58.3